F. A. WARD.
METHOD OF GRINDING SPLINE SHAFTS AND OTHER INTERRUPTED CYLINDRICAL BODIES.
APPLICATION FILED AUG. 13, 1912.

1,271,495.

Patented July 2, 1918.
2 SHEETS—SHEET 1.

WITNESSES:

INVENTOR
Frederick Alexander Ward
BY
ATTORNEYS

F. A. WARD.
METHOD OF GRINDING SPLINE SHAFTS AND OTHER INTERRUPTED CYLINDRICAL BODIES.
APPLICATION FILED AUG. 13, 1912.
1,271,495.
Patented July 2, 1918.
2 SHEETS—SHEET 2.
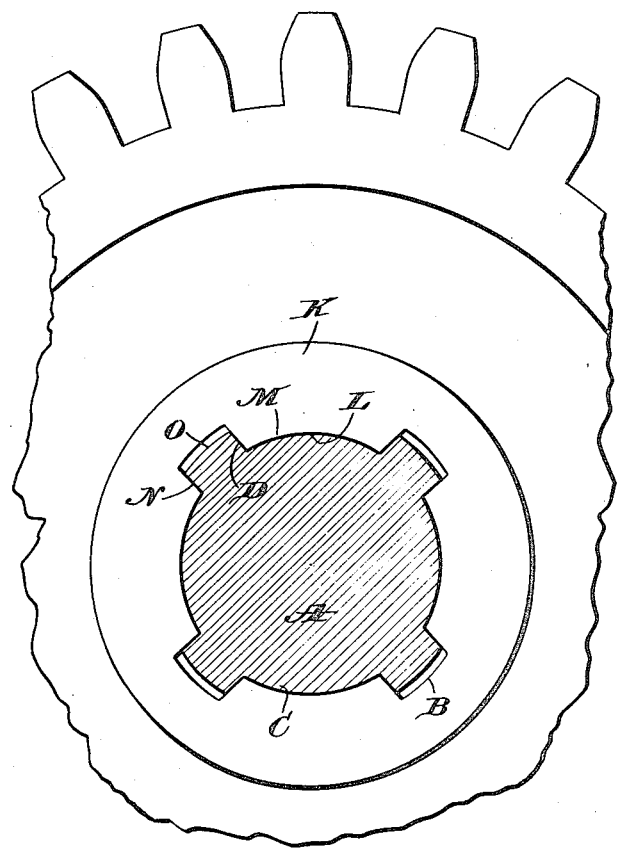
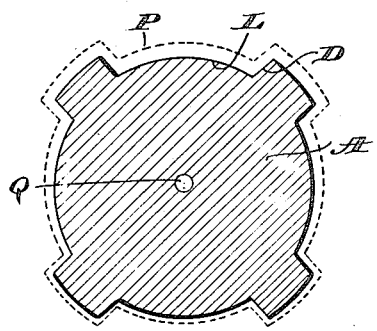
Inventor:
Frederick Alexander Ward,
By Whittemore Hulbert + Whittemore
Attorneys

UNITED STATES PATENT OFFICE.

FREDERICK ALEXANDER WARD, OF DETROIT, MICHIGAN, ASSIGNOR TO GEAR GRINDING MACHINE COMPANY, OF DETROIT, MICHIGAN, A CORPORATION OF MICHIGAN.

METHOD OF GRINDING SPLINE SHAFTS AND OTHER INTERRUPTED CYLINDRICAL BODIES.

1,271,495.   Specification of Letters Patent.   Patented July 2, 1918.

Application filed August 13, 1912. Serial No. 714,810.

*To all whom it may concern:*

Be it known that I, FREDERICK A. WARD, a citizen of the United States of America, residing at Detroit, in the county of Wayne and State of Michigan, have invented certain new and useful Improvements in Methods of Grinding Spline-Shafts and other Interrupted Cylindrical Bodies, of which the following is a specification, reference being had therein to the accompanying drawings.

My invention aims to provide certain improvements in the production or in the grinding of splined shafts and other interrupted cylindrical bodies.

In the present state of the art in various structures such for instance as sliding gear transmission mechanism, it is found desirable to employ spline shafts having integral keys or splines, and these parts are either heat-treated or left soft. One method of forming such structures is to machine the soft or annealed metal to the proper form and then to harden the same, but in this it is extremely difficult to secure accurate work on account of the slight warping or change in form due to tempering. This method is also applicable to soft shafts that can be roughly fashioned and then finished by this device to greater accuracy than with a finishing tool. On the other hand it is impossible to grind the shafts by the usual method of placing them in a grinding machine as the splines interrupt the continuity of the cylindrical or other curved surface.

The present invention overcomes the difficulty by the novel method as hereinafter set forth.

In the drawings:

Fig. 6 is a section of a shaft with a segment of a sliding gear thereon.

Fig. 7 is a transverse section showing a comparison between the outlines before and after grinding.

The articles which are fashioned by my improved grinding process consist essentially of longitudinally extended bodies having a plurality of fashioned sides or segments, all points in which have a predetermined relation to a common longitudinal axis. Specifically the spline shafts commonly used in transmission gearings and for similar purposes consist of cylindrical (using the term "cylindrical" generically as including other curves than the arc of a circle) forms, adapted to exactly fit corresponding cylindrical bores in the gears or other slidable members with one or more projecting splines interrupting the continuity of these curved surfaces and fashioned to exactly fit the key seat in the slidable member. As shown, A is a spline shaft provided with four splines B distributed about the axis at equal angles. Intermediate the splines are cylindrical segments C, while the sides D of the splines are parallel to each other and are positioned to give an exact thickness.

My improved method of grinding such articles consists essentially; first, in trimming a grinding medium into exact conformity to one side or segment of the finished structure; and in then alternately reciprocating and rotatively adjusting the work with respect to the grinder to successively grind the sides thereof concentric with or equidistant from the longitudinal axis, and in gradually adjusting the grinder toward the work or vice versa until the latter is reduced to finished size. During this operation the grinder is restored to form as frequently as found necessary to maintain its form and the fashioned surface as finished includes the sides of the splines as well as the cylindrical or curved segments.

Figure 1:
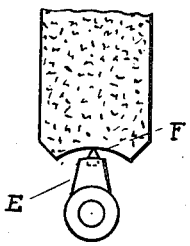
Figures 1 and 2 are diagrammatic sections illustrating the operations of trimming the grinder.
Figure 3:
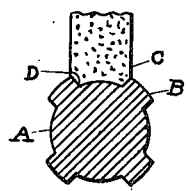
Fig. 3 illustrates the grinding of the spline shaft with the accurately formed grinding medium.
Figure 2:
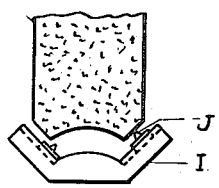
Figure 4:
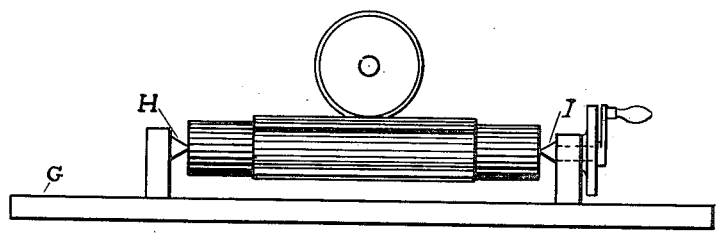
Fig. 4 is a diagrammatic side elevation of a machine on which the work and trimming mechanism is located.
Figure 5:
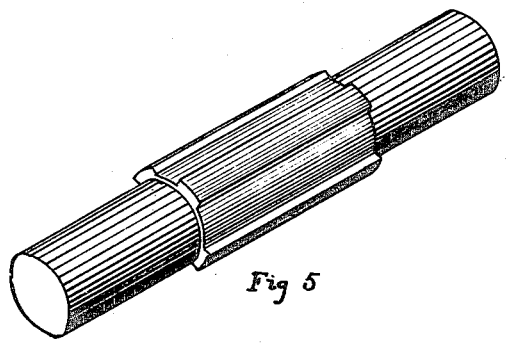
Fig. 5 is a perspective view of the completed work.

In Fig. 1, the operation of trimming the segmental surface of the grinder is illustrated, this being accomplished by a pivoted trimming tool E provided preferably with a diamond point F and of a radius exactly corresponding to that of the finished work. The tool E may be mounted upon the work table or bed G in alinement with the centers H on which the work is mounted, and thus after trimming of the grinder it may be engaged with the work in precise relative position.

The trimming of the grinding surface which fashion the sides of the splines, is preferably accomplished by a separate tool holder I having angling sides corresponding to the angles of the finished work and adjustable trimmer points J which may be reciprocated on said sides to trim the wheel.

One of the centers H' on which the work is mounted is connected with an indexing mechanism I', the spindle of which may be rotatively adjusted to the exact angle desired.

In carrying out the method the grinding wheel is first trued to form by simultaneous or successive operations of the trimmer E and points J. The wheel and work to be ground are then adjusted into operative relationship with each other, and the one or the other is alternately reciprocated in a longitudinal direction with the axis of the work, and the work is rotatively adjusted respectively by the operation of the indexing mechanism I'. Thus instead of grinding each side to finished size before operating upon another side, the same grinding cut is taken successively over all the sides before any change in adjustment for another cut. This sequence of operation has the advantage first that the heating effect produced by grinding is uniformly distributed over the shaft, which prevents any warping action, and secondly, it permits the operator to gradually reduce the work to finished size, testing from time to time with a micrometer or other gage.

Before the final cut reducing the work to size the grinder medium is preferably reformed so as to impart to the finished work the exact form as predetermined.

Throughout the specification and claims the term "cylindrical" is used generically to include non-circular as well as circular bodies.

In a previous patent of myself and Taylor No. 1,104,589 there is disclosed a method of grinding the teeth of gears by means of a grinding wheel which passes between the teeth. Such grinding of the gears for automobile transmissions and the like has been practised for some years prior to this application and has produced a substantial improvement in such transmissions. But a satisfactory shaft for the sliding gear has not been available prior to this invention. Splined shafts were defective because if hardened by heat treatment they were always badly distorted, and if not so hardened they were soon worn or their surfaces injured by the sliding of the hardened gears thereon. In the best transmissions resort was had to square shafts because these after heat treatment could be ground on their flat faces by old and known methods. These are objectionable for two reasons; first, they require a correspondingly square hole with ground faces through the hub of the gear which is expensive and difficult to make and, second, the bearing surfaces of the gear on the shaft are at an extreme angle to the line of pressure in the rotation of the gear in use; whereas with a splined shaft, the gear hub has a round hole through it which can be easily ground with great accuracy and the radial (or approximately radial) sides of the splines provide a perfect bearing surface normal to the direction of pressure of the gear on the shaft during rotation.

Splined shafts were also used which were hardened and ground on the outer cylindrical faces of the splines because such faces could be ground on the well known cylindrical grinding machines, but the bottoms of the broached grooves in the gear hubs could not be commercially ground and without this an exact bearing on the outer faces of the splines could not be secured. But there was no known way of making splined shafts which should be as hard as the gears sliding thereon and should be exactly straight and true to dimensions and which should provide a bearing surface on the portions of the shaft between the splines.

In splined shafts, the sides of the space (flanks of the splines) are flat and the distance between them must be maintained rigidly to prevent looseness of the gear, which would injure the sliding bearing surfaces. In good practice the spacing of such flanks from each other is held within a thousandth of an inch or less. And the bottom of the groove between splines must be accurately shaped and located with respect to the center of the shaft. The flat side faces of the ribs must also be carried down to the circular line of the bottoms of the grooves. Furthermore the exactness referred to must be maintained throughout the length of the splined portion of the shaft, and the tendency of a shaft to bend in the plane of its length during its cutting and heat treatment is a matter known to skilled persons in this art.

Fig. 6 illustrates the relations between a shaft A and a gear J having a hub K sliding thereon. The ground bottoms L of the grooves on the shaft are fitted exactly to the corresponding ground faces M of the gear hub, and the four faces L are equidistant from the center of the shaft. The flat faces D of the splines are ground and so accurately spaced as to make a perfect sliding fit with the sides N of the broached grooves in the gear hub. The outer faces O of the splines are clear of the opposed faces of the hub and need not be ground.

I believe that such a splined shaft itself, hardened by heat treatment or otherwise made so hard that it cannot be cut to shape, and then shaped by grinding to produce bearing faces L accurately shaped and symmetrically located with reference to the axis, and this throughout its length, is new; and that it is further new to provide such a shaft with the side bearing surfaces D ground flat and straight from end to end and from their inner to their outer edges and accurately and equally spaced from each other.

In efforts to obtain a satisfactory splined heat-treated shaft it has also been proposed to make the splines separately and to set them in grooves in the shaft after grinding the circular faces of the shaft on the well-known cylindrical grinders. Another scheme which has been tried is to remove the high spots arising from heat treatment by hand rubbing or by grinding with loose abrading material placed between the shaft and a gear which has been shoved back and forth on the shaft until a sufficiently loose fit has been secured. Besides being terribly slow and expensive this method has not produced a straight shaft or one of uniform diameter or of exact concentricity with its axis throughout its length. See Fig. 7, where A is the finished shaft and P indicates in dotted outline the cross-section at this point before grinding. Suppose this section taken at the point where the distortion by heat treatment has produced the greatest eccentricity. According to my process all the faces L and D are ground down to an exact radial distance from the true axis Q and in exact angular relation with each other throughout the length of the shaft, even though at one cross-section the outline is at P and at another cross-section in some other position; and this involves, of course, leaving on the shaft before hardening sufficient stock for the subsequent grinding operations at all points. But in the hand rubbing and similar operations referred to the shaft has been milled or hobbed to final size and heat treated with the greatest care to minimize distortion and then such shafts as did not slide freely through a test gear were rubbed or ground merely to remove the high spots here and there,—producing a shaft always small enough, generally too small at one or more points along its length and almost never quite straight and true with relation to its axis of revolution.

The member which is mounted on the splined shaft may be not only a gear, as above described, but any one of various other devices whose center has to coincide accurately with the central axis of the shaft on which it is carried. And while the invention is of particular value in the case of members which have a sliding fit and are intended in operation to slide on the shaft, it is of great value also where the member is mounted at a fixed point in the length of the shaft, as for example, by a press fit. In the case of a sliding or a non-sliding gear or other member, the important point is to locate the center of operation of such a member on the axis of rotation of the shaft, and this is perfectly accomplished by the accuracy with which the bottoms of the grooves on the shafts and the complementary faces of the bore of the gear can be ground.

In the present application no claim is made to the shaft, this being the subject of a divisional application Serial No. 233,088, dated May 7th, 1918.

What I claim as my invention is:

1. The method of grinding obstructed cylindrical surfaces, comprising relatively reciprocating the work and the grinder wheel parallel to the axis of the former, said wheel being provided with a concave peripheral surface of exactly predetermined arc corresponding in radius to that of the finished cylindrical surface and of a length corresponding to that between the obstructions in the finished surface of the work, and also provided with a fashioned surface at the edge of the concave portion for grinding the face of the obstruction; rotating the work to a series of exactly predetermined positions intermediate reciprocations to present different segments to the grinding action and re-trimming the surface of said grinder to restore its exact form prior to the finishing cut.

2. The method of grinding obstructed cylindrical surfaces, comprising mounting the work and a grinder wheel in an organized work-grinding machine, adapted to relatively reciprocate the one in relation to the other and parallel to the longitudinal axis of the work; trimming said wheel while thus mounted to form a concave peripheral surface of exactly predetermined arc corresponding in radius to that of the finished cylindrical surface, and of a length corresponding to that between the obstructions in the finished surface of the work, and also having a fashioned surface at the edge of the concave surface for grinding the face of the obstruction; and rotating the work through a series of exactly predetermined positions to present different segments to the grinding action.

3. The method of producing a shaft which consists in forming the same of hardened steel with projecting splines and intermediate grooves between the splines, leaving stock for grinding throughout the splined portion, and grinding with a formed wheel bearing faces on the bottoms of said grooves thoughout their length and width and symmetrically with reference to the axis of the shaft.

4. The method of producing a shaft which consists in forming the same of hardened steel with projecting splines and intermediate grooves between the splines, leaving stock for grinding throughout the splined portion, grinding with a formed wheel bearing faces on the bottoms of said grooves throughout their length and width and symmetrically with reference to the axis of the shaft, and by means of said formed wheel grinding the flanks of the splines parallel to the axis and straight from end to end and from their bottom to their top edges.

5. The method of producing a shaft which consists in forming the same of hardened steel with projecting splines and intermediate grooves between the splines, leaving stock for grinding throughout the length of the splined portion and grinding with a formed wheel bearing faces on the bottoms of said grooves throughout their length and symmetrically with reference to the axis of the shaft.

In testimony whereof I affix my signature in presence of two witnesses.

FREDERICK ALEXANDER WARD.

Witnesses:
KATHLEEN C. THOMPSON,
ERNEST PARKER.